United States Patent [19]

Drapac et al.

[11] Patent Number: 4,961,073

[45] Date of Patent: Oct. 2, 1990

[54] BATTERY SAVING APPARATUS AND METHOD PROVIDING OPTIMUM SYNCHRONIZATION CODEWORD DETECTION

[75] Inventors: George Drapac; Stephen H. Woltz, both of Boca Raton; Mark L. Oliboni, Boynton Beach, all of Fla.

[73] Assignee: Motorola, Inc., Schaumburg, Del.

[21] Appl. No.: 315,957

[22] Filed: Feb. 27, 1989

[51] Int. Cl.$^5$ .............................................. H04B 7/00
[52] U.S. Cl. .......................... 340/825.44; 340/825.47; 455/38; 455/343
[58] Field of Search ........... 340/311.1, 825.44, 825.47, 340/825.48; 455/31, 32, 38, 228, 343

[56] References Cited

U.S. PATENT DOCUMENTS

| | | | |
|---|---|---|---|
| 4,353,065 | 10/1982 | Mori | 455/343 |
| 4,506,386 | 3/1985 | Ichikawa et al. | 455/343 |
| 4,652,875 | 3/1987 | Waki | 340/825.44 |
| 4,837,854 | 6/1989 | Oyogi et al. | 455/343 |

OTHER PUBLICATIONS

The Post Office Code Standardization Advisory Group, "Standard Message Formats for Digital Radiopaging", Autumn 1980.

Primary Examiner—Donald J. Yusko
Assistant Examiner—Dervis Magistre
Attorney, Agent, or Firm—Philip P. Macnak; Vincent B. Ingrassia; Anthony Sarli, Jr.

[57] ABSTRACT

A battery saving apparatus for supplying power to a selective call communication receiver for enabling the detection of a synchronization codeword in data received in a predetermined signaling format comprises circuits for supplying power to the receiver, and for detecting valid data received during a first portion of the first predetermined time interval. Power is maintained to the receiver for the remainder of the first predetermined time interval when valid data is detected in the first portion. A synchronization codeword detector is included for detecting a synchronization codeword. When valid data is subsequently detected following a second portion of the first predetermined time interval and the synchronization codeword is not detected in the first predetermined time interval, power is maintained to the receiver for a second predetermined time interval to further enable detection of the synchronization codeword.

34 Claims, 8 Drawing Sheets

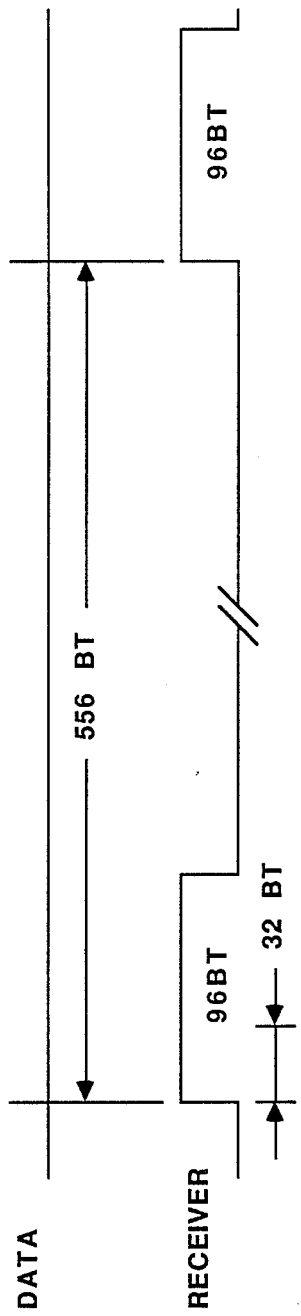
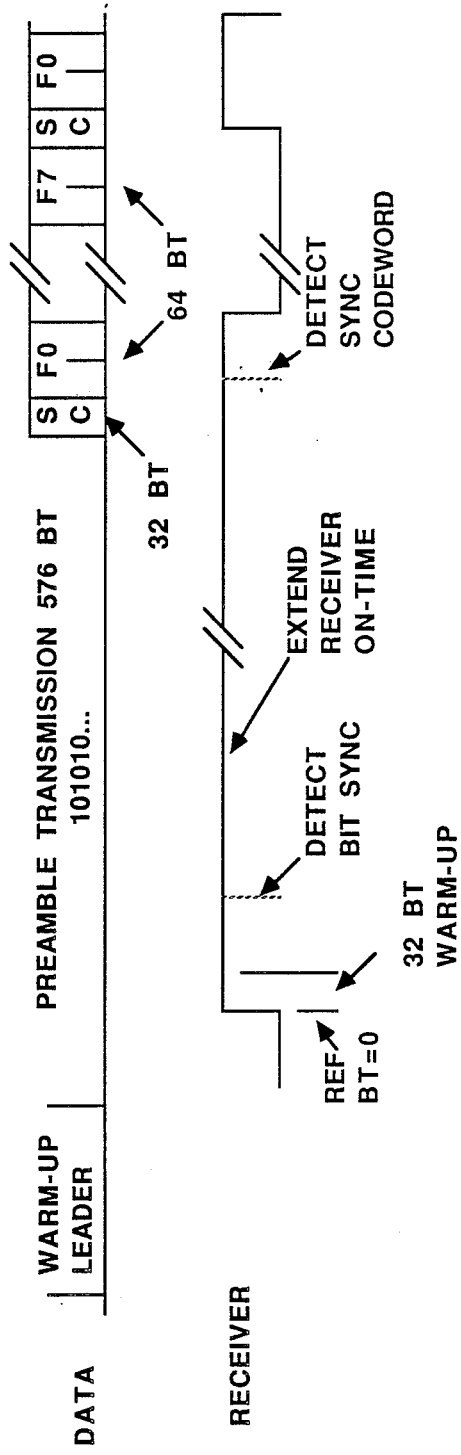
FIGURE 2A
FIGURE 2B

BATTERY SAVING APPARATUS AND METHOD PROVIDING OPTIMUM SYNCHRONIZATION CODEWORD DETECTION

BACKGROUND OF THE INVENTION

1. Field of the Invention

This invention relates to a battery saving apparatus and method for supplying power to a selective call communication receiver for enabling the detection of a synchronization codeword in a predetermined selective call signaling format, and more particularly, for supplying power to the selective call communication receiver for enabling an optimal detection of the synchronization codeword following either a variable bit length preamble or data transmitted in a different signaling format, so as to provide an improved battery saver function.

2. Description of the Prior Art

The are numerous selective call signaling formats in use today which include a synchronization codeword for providing a selective call receiver, such as a pager, the ability to be synchronized with transmitted selective call messages. One such system which has been widely used is the POCSAG signaling format, shown in FIG. 1. The POCSAG signaling format includes a preamble (P) which is a pattern of bit reversals, 0101010..., transmitted at an address and data bit rate, or baud rate, of 512 or 1200 bits per second. The preamble is followed by one or more batches (B) of selective call messages, each batch commencing with the synchronization codeword (SC) followed by eight frames (F) containing two codewords. Each codeword is a thirty-two bit binary word, representing the address or message information. Pagers operating in a POCSAG system are assigned to one of the eight frames to provide a battery saving function during the transmission of the addresses and messages. The preamble is transmitted for at least 576 bit times, which corresponds to the time required to transmit at least one complete batch of selective call messages plus one additional codeword. This, in principle, insures that a sufficient number of preamble bits are transmitted for the selective call receiver to attain bit synchronization, and for the selective call receiver to receive at least one complete synchronization codeword to attain word synchronization.

In normal operation, when a prior art pager in a POCSAG system had not detected the synchronization codeword on the channel during two consecutive batches, the normal battery saver cadence was interrupted and power was periodically supplied to the receiver in less frequent time intervals, allowing any data on the channel to be monitored and detected as the pager searched for the synchronization codeword. When data was detected on the channel during the periodic supply of power, power to the receiver was maintained for an additional time interval to allow the detection of the synchronization codeword. When the synchronization codeword was not detected during the balance of the time interval, power to the receiver was terminated until the next periodic time interval. Failure to detect the synchronization codeword during the extended time interval was often the result of the pager falsing on noise, or falsing on data transmitted in a different signaling format which shares the use of the same channel. The occurrence of false data detections on shared channels, especially where the signaling formats sharing the channel have the same or substantially the same baud rates, can be significant, being as much as a ten per cent false detection rate and more, depending on the nature of the data on the channel. As a result, prior art pagers have generally been designed to operate at, or close to, the minimum 576 bit time repetition rate, required to optimally detect the synchronization codeword. Battery life was maximized in this instance, even with the false detection of data on the channel, however, at the expense of possibly missing a page, as previously described.

While the battery life was optimized by operating the pager at a 576 bit time repetition rate, other problems were encountered. When a transmitter is keyed, the transmitter is not instantaneously up to full power. Consequently, transmission of the preamble has to be delayed, to guarantee the complete transmission of the preamble. As a result, a transmitter warm-up leader was often provided prior to the transmission of the preamble. Such a warm-up leader had to be selected so as to not generate false data detection, otherwise power could be supplied to the receiver during the warm-up leader time, which would often result in missing the detection of the synchronization codeword. This in turn would result in missing a message directed to the pager. One prior art pager solved this problem by generating a synchronization codeword search window approximately twice as long as the optimum 576 bit time repetition rate when data was detected on the channel. While this guaranteed the detection of the synchronization codeword, it was at the expense of battery life which was reduced by false data detections on the transmitter warm-up leader, on noise, and on data in different signaling formats which shared the same channel.

A method for supplying power to a selective call communication receiver at the optimum batch interval is required to maximize receiver battery life. Such a method, must however, also allow for the detection of the synchronization codeword during intervals of time which can be significantly greater than the optimum 576 bit time batch time interval.

SUMMARY OF THE INVENTION

A battery saving apparatus is described for supplying power to a selective call communication receiver for enabling the detection of a synchronization codeword in data received in a predetermined signaling format. The battery saving apparatus includes circuits for supplying power to the receiver for detecting valid data in the predetermined signaling format during a first portion of the first predetermined time interval. Also included is a circuit for maintaining the supply of power to the receiver for the remainder of the first predetermined time interval in response to valid data being detected. A circuit, responsive to the received data is included for detecting the synchronization codeword during a first predetermined time interval, as is a circuit for subsequently detecting valid data following a second portion of the first predetermined time interval in response to the synchronization codeword not being detected in the first portion. A circuit for further maintaining the supply of power to the receiver for a second predetermined time interval is included in response to the subsequent detection of valid data during the second portion of the first predetermined time interval, and the synchronization codeword not being detected during the first predetermined time interval.

It is an object of the present invention to provide a battery saving apparatus which allows a selective call communication receiver to be strobed at an optimum rate for synchronization codeword detection.

It is a further object of the present invention to provide a battery saving apparatus that maximizes the receiver battery life when falsed on noise or data transmitted in a different signaling format.

It is a further object of the present invention to provide a battery saving apparatus capable of detecting the synchronization codeword during time intervals substantially greater than the optimum receiver strobe repetition rate.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which:

FIG. 2A is a timing diagram of the battery saving cadence for the preferred embodiment of the present invention, showing the synchronization codeword search sequence when data is not present on the channel.

FIGS. 2B and 2C are timing diagrams of the battery saving cadence for the preferred embodiment of the present invention operating as the prior art, showing the synchronization codeword search sequence with data on the channel including a transmitter warm-up leader.

DESCRIPTION OF THE PREFERRED EMBODIMENT

Figure 1:
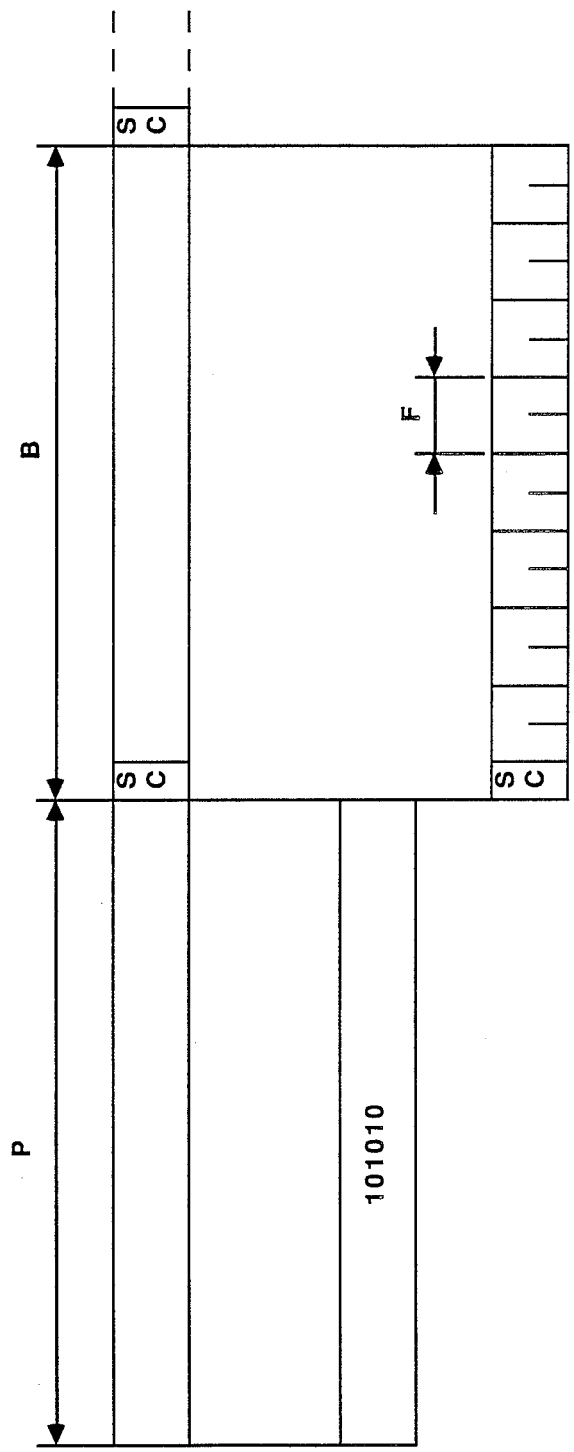
FIG. 1 is a timing diagram of the POCSAG signaling format.

With respect to the figures, FIGS. 2 through 8 illustrate the preferred embodiment of the present invention, a battery saving apparatus and method for supplying power to a selective call communication receiver for enabling the detection of a synchronization codeword in a predetermined signaling format. In particular, FIG. 2A shows the timing diagram of the operation of the selective call communication receiver, such as a paging receiver or pager, operating in the bit acquisition mode on an inactive channel, or on a channel currently transmitting data in a different selective call signaling format. The selective call communication receiver of the present invention is described in conjunction with the use of the POCSAG signaling format, which is described by way of example only, and it will be appreciated that other selective call signaling formats can be utilized to provide the same operation.

In the operation shown in FIG. 2A, power is periodically supplied to the selective call receiver to allow the receiver to monitor the channel for the presence of data, which may be either a preamble, or selective call messages, including either address or message information. In the preferred embodiment of the present invention, power is supplied to the receiver for a period of ninety-six bit times out of 556 bit times. All references to bit times and time intervals in the following description are based on the POCSAG signaling format with the receiver operating at the standard 512 bit per second data rate. During the first thirty-two bit times, which corresponds to a time interval of 62.5 milliseconds, the processing of received data is inhibited, as will be described in detail later. This time interval provides a receiver warm-up time interval which is required to allow such circuits, as the receiver's oscillators, to be powered and stabilize, insuring the receiver is properly receiving data present on the channel. The time interval for receiver warm-up described is by way of example only, and it will be appreciated more or less time may be allocated depending upon the specific warm-up requirements of the receiver. During the balance of the ninety-six bit times, corresponding to a time interval of 125 milliseconds, the receiver searches for bit synchronization. Should bit synchronization not be attained during the ninety-six bit time interval, power to the receiver is terminated, as shown. As further shown in FIG. 2A, in the preferred embodiment of the present invention, power is periodically supplied to the receiver every 556 bit times during the bit synchronization search period. This corresponds to a time interval of approximately 1.086 seconds, allowing for a more reliable detection of data following intervals when data in a different signaling format was transmitted.

When sufficient data is available to transmit, as shown in FIG. 2B, the data transmitted generally includes a transmitter warm-up leader, the duration of which is a function of the transmitters in the system, and the time required to key the transmitters. A preamble, of at least 576 bit times in duration is then transmitted, followed by a thirty-two bit synchronization codeword, and eight sixty-four bit frames, each frame including two thirty-two bit address or message codewords. As shown in FIG. 2B, the receiver is strobed so as to be powered during the preamble transmission time. As previously described, power is initially supplied to the receiver for a ninety-six bit time interval. Detection of the preamble is inhibited during the first thirty-two bit times to allow receiver warm-up. During the balance of the ninety-six bit times, after bit synchronization is attained and valid data is detected, the supply of power is maintained to the receiver for the balance of a 576 bit time interval to allow the receiver to detect the synchronization codeword. As shown in FIG. 2B, after the synchronization codeword has been detected, the receiver begins the well known battery saver cadence used for address and message detection in the POCSAG signaling format.

Figure 2C:
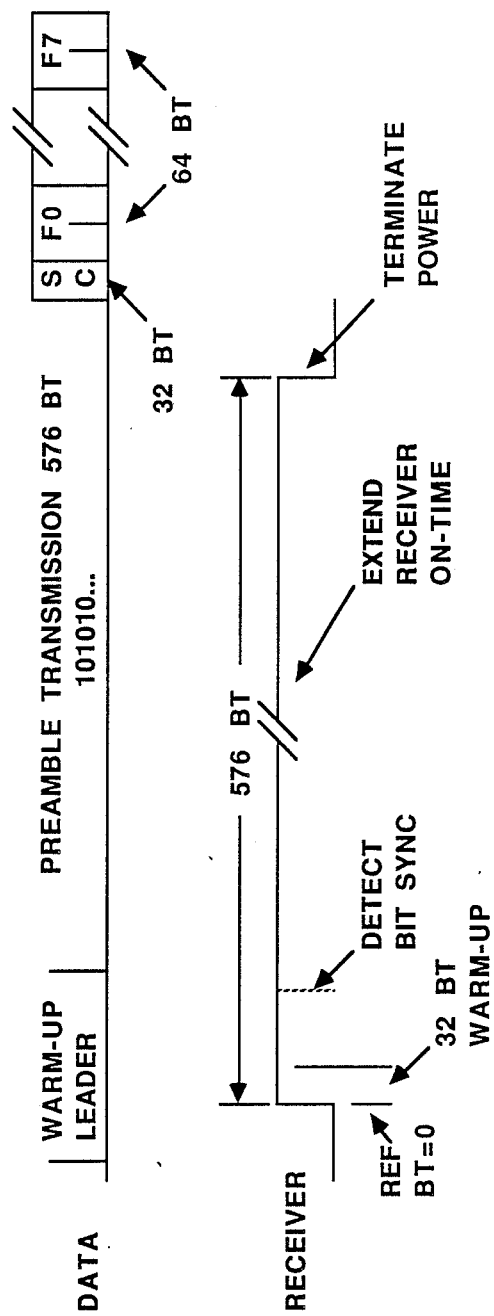

However, as shown in FIG. 2C, since power is asynchronously supplied to the receiver during the search for bit synchronization, power can be supplied to the receiver during the transmission of the transmitter warm-up leader. When this occurs, as shown, it is likely a false bit synchronization detection can occur with the warm-up leader information. This is especially likely when the warm-up leader information is at a bit rate harmonically related to the bit rate of the POCSAG data, or when the bit rate is close to that of the POCSAG data. The latter example of a false detection for bit synchronization may also occur in the normal course of data transmission on systems providing mixed signaling formats, such as the POCSAG signaling format and the Golay Sequential Code (GSC) signaling format. As shown in FIG. 2C, power is maintained to the receiver to enable the detection of the synchronization codeword. During the 576 bit time search interval power is supplied to the receiver, the synchronization codeword is not detected in this instance. As a result, power to the receiver is terminated, with the potential result of missing selective call messages intended for that particular receiver during the batch of messages which follow. One solution to this problem, which has been used in one or more prior art receivers, is to extend the search window beyond the 576 bit times. This would, however, result in substantially longer average receiver on times when the battery saver function is falsed on noise or data being transmitted in a different signaling format, which would result in a reduced battery life compared to a receiver operating with the 576 bit time search window.

Figure 3:
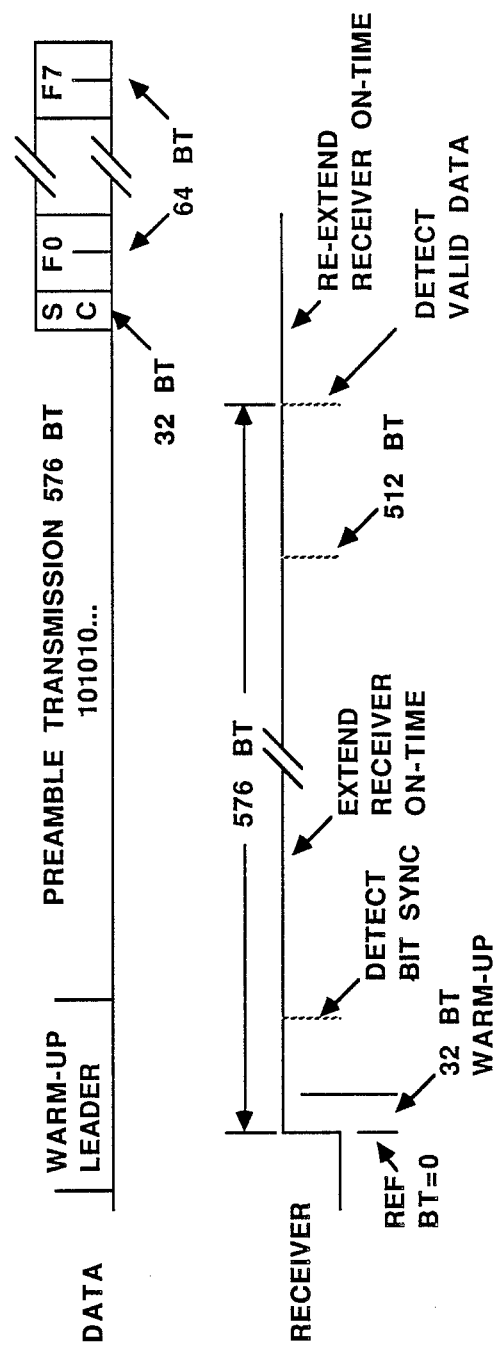
FIG. 3 is a timing diagram of the battery saving cadence for the preferred embodiment of the present invention, showing the synchronization codeword search sequence with data on the channel including a transmitter warm-up leader.

FIG. 3 is a timing diagram showing the operation of the preferred embodiment of the present invention. In the case shown, when power is initially supplied to the receiver, the receiver is turned on during the transmitter warm-up leader. The receiver attempts to obtain bit synchronization following the thirty-two bit warm-up time interval. While bit synchronization is being attained, a lock detector is also enabled sampling for the presence of valid POCSAG data on the channel. The operation of the lock detector will be described in detail later in the specification. When valid data is detected, power is maintained to the receiver for the 576 bits time interval, as previously described. Prior to the end of the 576 bit time interval, the data being transmitted on the channel is re-evaluated after a portion of the first time interval is completed, such as at a 512 bit time interval reference to when power was supplied to the receiver. This allows a sixty-four bit time interval prior to the end of the first time interval to subsequently detect valid data with the lock detector. When the receiver turn-on is initiated by falsing on noise, or on data in a different signaling format, the probability of subsequently detecting valid data is substantially reduced. In this instance, power to the receiver is terminated at the end of 576 bit times.

When power is supplied to the receiver during the transmission warm-up leader and valid data is being transmitted on the channel, the valid data would be detected during the time interval between 512 bit times and 576 bit times. In this instance, while the synchronization codeword was not detected in the first 576 bit time interval, power is maintained for a second time interval, such as extending the search window a fraction of the first time interval, or a full first time interval. Under normal conditions, this extended search window would allow sufficient time to detect the synchronization codeword. As soon as the synchronization codeword is detected, the normal battery saver cadence for receiving the selective call messages in the POCSAG signaling format is enabled.

In summary, as shown in FIG. 3, the search for the synchronization codeword is continued for an additional 576 bit times when the receiver is falsed, either by noise or data not intended for the receiver. As long as valid data is subsequently detected on the channel, prior to the end of the first 576 bit time interval, power is maintained for a second 576 bit time interval to search for the synchronization codeword. The operation of the receiver, as described, would result in improved battery life compared to a receiver which operates with an extended synchronization codeword search window.

Figure 4:
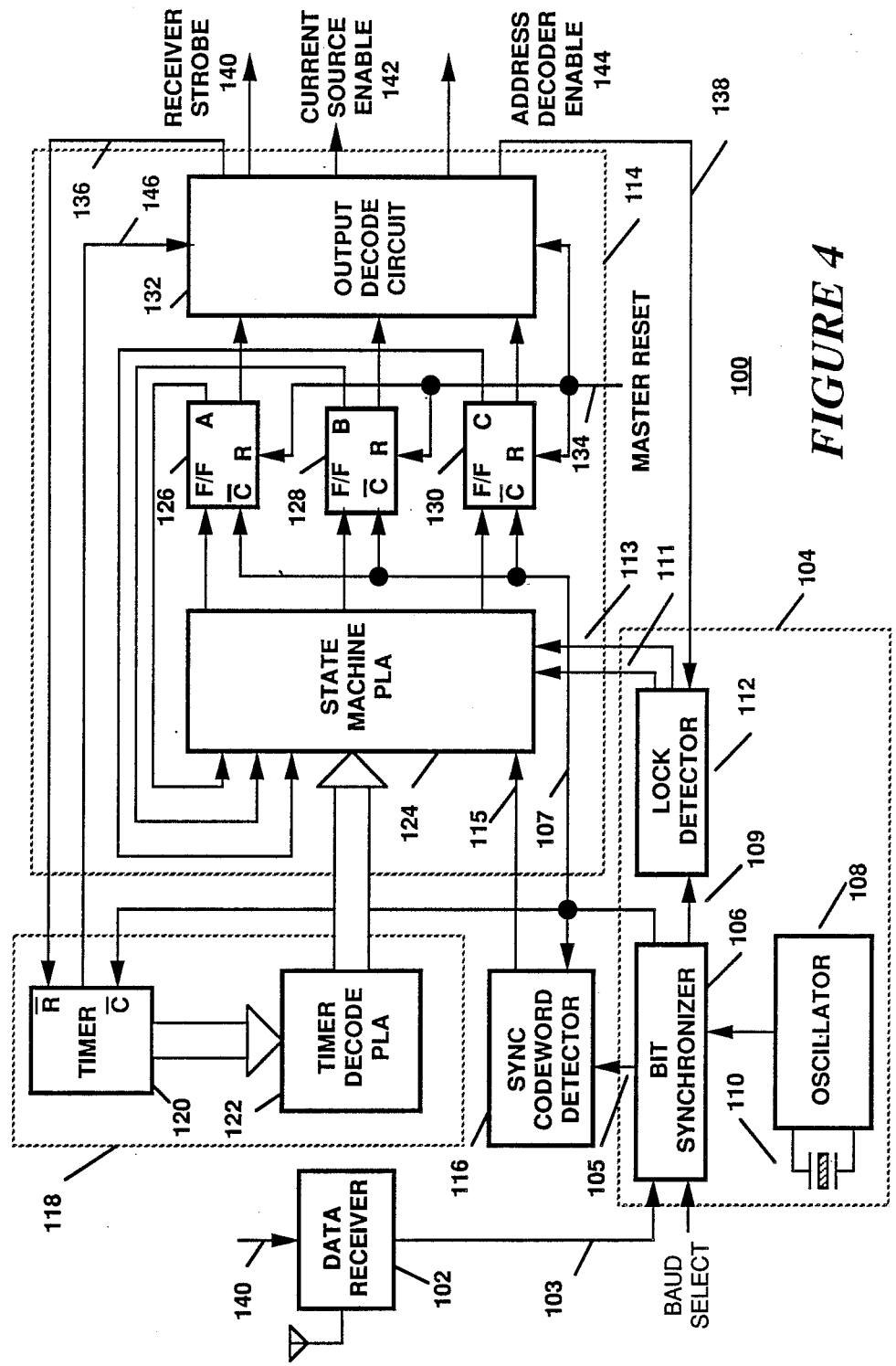
FIG. 4 is an electrical block diagram of a portion of a selective call communication receiver, providing the battery saving cadence for the preferred embodiment of the present invention.

FIG. 4 shows an electrical block diagram of a portion of a selective call receiver constructed in accordance with the preferred embodiment of the present invention, which provides the battery saving apparatus 100 for synchronization codeword detection. The transmitted selective call messages are received by a data receiver 102. The output of data receiver 102 is a stream of binary data 103 corresponding to the transmitted preamble and address and message information present on the channel. The output of data receiver 102 couples to a bit synchronization means, such as bit synchronizer 106. Bit synchronizer 106 includes a baud select input, for selecting the baud rate for receiving data in the predetermined signaling format, such as the 512 bit per second or 1200 bit per second POCSAG signaling format. A crystal controlled oscillator 108, provides a bit clock signal to the bit synchronizer 106. A 76.8 KHz crystal 110 is coupled to crystal controlled oscillator 108 for controlling the oscillator frequency. Bit synchronizer 106 generates a recovered bit clock signal, that is a bit clock signal 107 which is synchronized with the transmission rate of the received data when bit synchronization is attained. Bit synchronizers are well known to one of ordinary skill in the art. One example of a bit synchronizer suitable for implementation in the preferred embodiment of the present invention is described in detail in a U.S. Pat. No. 4,414,676, entitled "Signal Synchronization System" to Kraul et al, issued Nov. 8, 1983 which is incorporated by reference herein.

A lock detector means, such as lock detector 112, is coupled to bit synchronizer 106 which provides both received data and a window signal output 109, the function of which is to be described in detail shortly. The received data may be either the preamble or address and message information. When a sufficient number of valid data bits are received the lock detector generates a valid data signal, or lock signal, 113. Lock detector 112 operates as a baud rate detector, and the determination of valid data is based on detecting data transmitted at the proper baud rate. Lock detector 112, in addition to having a valid data output 113, provides an invalid data output 111 which is used to terminate early the search for the synchronization codeword when invalid data, such as noise or data in a different signaling format is detected on the channel. The invalid data signal 111 and the valid data signal 113 are coupled to the battery saver controller means 114.

Also coupled to the recovered bit clock signal 107 is the synchronization codeword detector means, such as synchronization codeword detector 116. The input of synchronization codeword detector 116 also couples to bit synchronizer 106 for correlating recovered data 105 for the synchronization codeword. Recovered data 105 is received data synchronized with the recovered clock signal. The operation of synchronization codeword detector 116 is well known to one of ordinary skill in the art. Synchronization codeword detector 116 has a synchronization word detector output 115 which couples to the battery saver controller means 114, and generates a codeword absent signal, such as having a logic zero value, when the synchronization codeword has not been detected, and a codeword present signal, such as having a logic one value, when the synchronization codeword has been detected in the received data.

Timing means 118 is responsive to the recovered bit clock signal 107, for generating timing signals used in the control of the synchronization codeword detection operation. Timing means 118 includes a timer 120 clocked by the recovered bit clock signal 107. Timer 120 may be implemented using a series of flip-flop dividers suitably tapped to select a plurality of predetermined bit times corresponding to the timing requirements of the present invention. The predetermined bit times required for operation include outputs at thirty-two, ninety-six, 512, 556 and 576 bit times for 512 bit per second POCSAG signaling, and forty, 104, 512, 556 and 576 bit times for 1200 bit per second POCSAG signaling. It will be appreciated that the bit times indicated above are by way of example only, and that other bit times may be utilized, such as would be required when the preferred embodiment of the present invention is constructed for use with a different signaling format. Timer 120 is reset by timer reset signal 136 to initiate each timing sequence. The description to follow will be directed to POCSAG data transmitted at 512 bits per second.

Timer 120 generates a first timer signal output which is generated for ninety-six bit times, signaling the end of a first portion of the 576 bit time interval, the first portion set aside for valid data detection. A second timer signal output is generated at 512 bit times, signaling the end of a second portion of the 576 bit time interval, the second portion set aside for synchronization codeword detection after which a subsequent detection of valid data on the channel by lock detector 112 is required to continue the synchronization codeword search beyond the first 576 bit time interval. A third timer signal output is generated at 576 bit times, signaling the end of the first predetermined time interval for synchronization codeword detection after valid data has been detected. A fourth timer signal output is generated at thirty-two or forty bit times, which signals the end of the time interval required for receiver warm-up time. It will be appreciated the time interval for receiver warm-up is a function of the particular receiver design, and may require a greater or lesser number of bit times to allow the receiver to stabilize at turn-on. A fifth timer signal output is generated at 556 bit times, signaling the end of the third predetermined time interval for attaining bit synchronization on a channel not currently transmitting data or transmitting data in a different signaling format.

The timer outputs described above couple to the input of timing decode PLA 122. The timing decode PLA 122 selects between multiple timer outputs for the proper output for the selected baud rate at which the receiver is to be operating. A baud rate selection input (not shown), controls the selection. The selected timing signals from the timing decode PLA 122 couple to battery saver controller means 114, for controlling the sequencing of the battery saver controller means for detection of the synchronization codeword. The timing decode PLA 122 is implemented using combinatorial logic in a manner well known to one of ordinary skill in the art.

The battery saver controller means 114 is a controller for controlling the operation of the battery saving apparatus for enabling the detection of the synchronization codeword. As shown in FIG. 4, the battery saver controller means 114 may be implemented using a state machine architecture which includes a state machine PLA 124, three clocked data flip-flops 126, 128 and 130, and an output decoder circuit 132. The use of a state machine to implement battery saver controller means 114 is by way of example only, and other means, such as a microprocessor controlled controller may be used as well.

The state machine PLA 124 includes inputs for a valid data signal, or lock signal, 113 and an invalid data, or unlock signal, 111 from lock detector 112. A synchronization codeword detection signal 115 from synchronization codeword detector 116 is provided, along with the selected timing signals from timing decode PLA 122, and output signals from the three clocked data flip-flops, flip-flop A 126, flip-flop B 128 and flip-flop C 130. The state machine PLA 124 has three outputs coupled respectively to flip-flop A 126, flip-flop B 128 and flip-flop C 130. A second output from flip-flop A 126, flip-flop B 128 and flip-flop C 130 couple to the input of output decoder 132. The output decoder circuit 132 generates a number of control signals in response to the three input signals. These signals include a receiver strobe signal 140 used to control the supply of power to the receiver, a current source enable signal 142 used to control power to specific functions, such as the synchronization codeword detector and the address detector, and an address and synchronization codeword detector power signal 144 to selectively enable the address detector and synchronization codeword detector functions. Output decode circuit 132 also generates a lock detector reset signal 138 and a timer reset signal 136. A master reset signal is coupled to flip-flop A 126, flip-flop B 128 and flip-flop C 130, and to the output decoder circuit 132 to initialize the states of the flip-flops, and to generate timer reset and lock detector reset signals, when power is initially turned on to the selective call receiver. The battery saver controller means 114 is implemented using conventional combinatorial logic in a manner well known to one of ordinary skill in the art.

Figure 5:
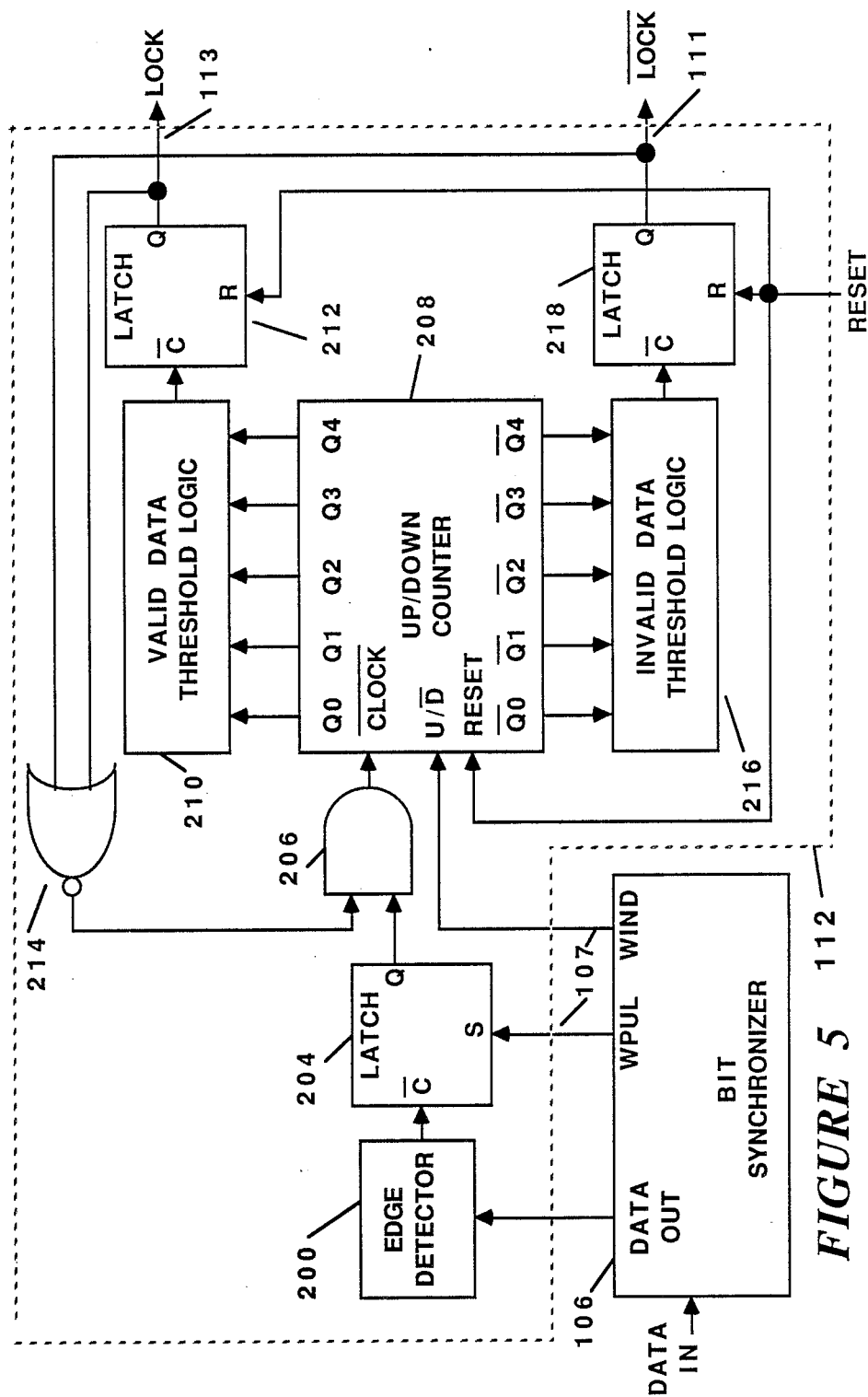
FIG. 5 is an electrical block diagram of the lock detector of the preferred embodiment of the present invention.

FIG. 5 is an electrical schematic diagram for the implementation of lock detector 112 in the preferred embodiment of the present invention. Received data is coupled to the input of edge detector means 200 which is used to indicate the occurrence of the data edges. Edge detector means 200 generates a pulse, or edge detection signal, when an edge is detected. Edge detection means 200 may be implemented in a number of ways, one such being an integrator which generates the pulse each time an edge is detected. The output of edge detector means 200 couples to the clock-not input of latch 204.

In order to avoid multiple bit detections due to noise, latch 204 is set at the beginning of the bit detection time interval by the WPUL signal 107 from bit synchronizer 106. When set, the output of latch 204 is a high output level which is reset by the edge detection signal. The high level output from latch 204 couples to one input of AND gate 206. The other input of AND gate 206 is coupled to the output of NOR gate 214 which is also a high level when lock detector 112 is unlocked, as will be explained shortly. With both inputs to AND gate 206 high levels, AND gate 206 generates a high level output which couples to the clock-not input of up/down counter 208. When latch 204 is clocked, as when an edge is detected, the output of latch 204 goes low, and in response the output of AND gate 206 goes low, clocking up/down counter 208. Latch 204 and AND gate 206 form a clock control means which is responsive to the edge detections signals for generating a clock signal for clocking up/down counter 208.

Up/down counter 208 is initially reset to all zeros by the reset input and is responsive to the clock signal described and the window signal generated by bit synchronizer 106. The count direction, either up or down is controlled by the window signal (WIND). Clock transitions generated by AND gate 206 cause up/down counter 208 to count up when the window signal (WIND) input is a high level during the time interval and edge is anticipated being present, and count down when the window signal (WIND) input is a low level during the time interval an edge is not anticipated being present, such as during the mid portion of the data bit. Up/down counter means 208 counts the number of in-phase and out-of-phase detections during the valid data search window during the first portion of the first predetermined time interval for a first detection of valid data, and again following the second portion of the first predetermined time interval, for the subsequent detection of valid data when valid data was not detected before the second portion started. The output of up-down counter means 208 is a binary output representing the count of in-phase and out-of-phase transitions.

The outputs of up-down counter means 208 couple to a count detection means consisting of valid data threshold logic 210 and invalid data threshold logic 216. Count detection means generate a valid data signal output from the valid data threshold logic 210, when the up-down counter means 208 output reaches a count of plus twenty in-phase bit counts, or a data invalid signal output from invalid data threshold logic 216, when the up-down counter means 204 output reaches a count of plus eight out-of-phase bits. It will be appreciated, the thresholds at which valid and invalid data are detected are for example only, and other thresholds may be selected based on such tradeoffs as falsing on noise or data transmitted in different signaling formats.

Up-down counter means 208 functions as a digital integrator, and as such, the bit time interval for valid data detection runs between twenty and six-four bits times, whereas the bit time interval for invalid data detection runs between eight and sixty-four bit times. When up/down counter 208 counts the correct number of in-phase bits determined by valid data threshold logic 210, a valid data, or lock, output 113 is generated clocking latch 212, setting latch 212 output to a high level. The output of latch 212 couples to the input of NOR gate 214 causing a low level output to be generated when valid data is detected. This low level output couples to the input of AND gate 206, inhibiting any further counting, and the inhibit is not released until a reset signal is generated to reset both up/down counter means 208 and latch 212.

When up/down counter counts the correct number of out-of-phase bits determined by invalid data threshold logic 216, an invalid data, or lock-not, output 111 is generated clocking latch 218, setting latch 218 output to a high level. The output of latch 218 also couples to the input of NOR gate 214 causing a low level output to be generated when invalid data is detected. This low level output couples to the input of AND gate 206, inhibiting any further counting, and the inhibit is not released until a reset signal is generated to reset both up/down counter means 208 and latch 218.

Figure 6:
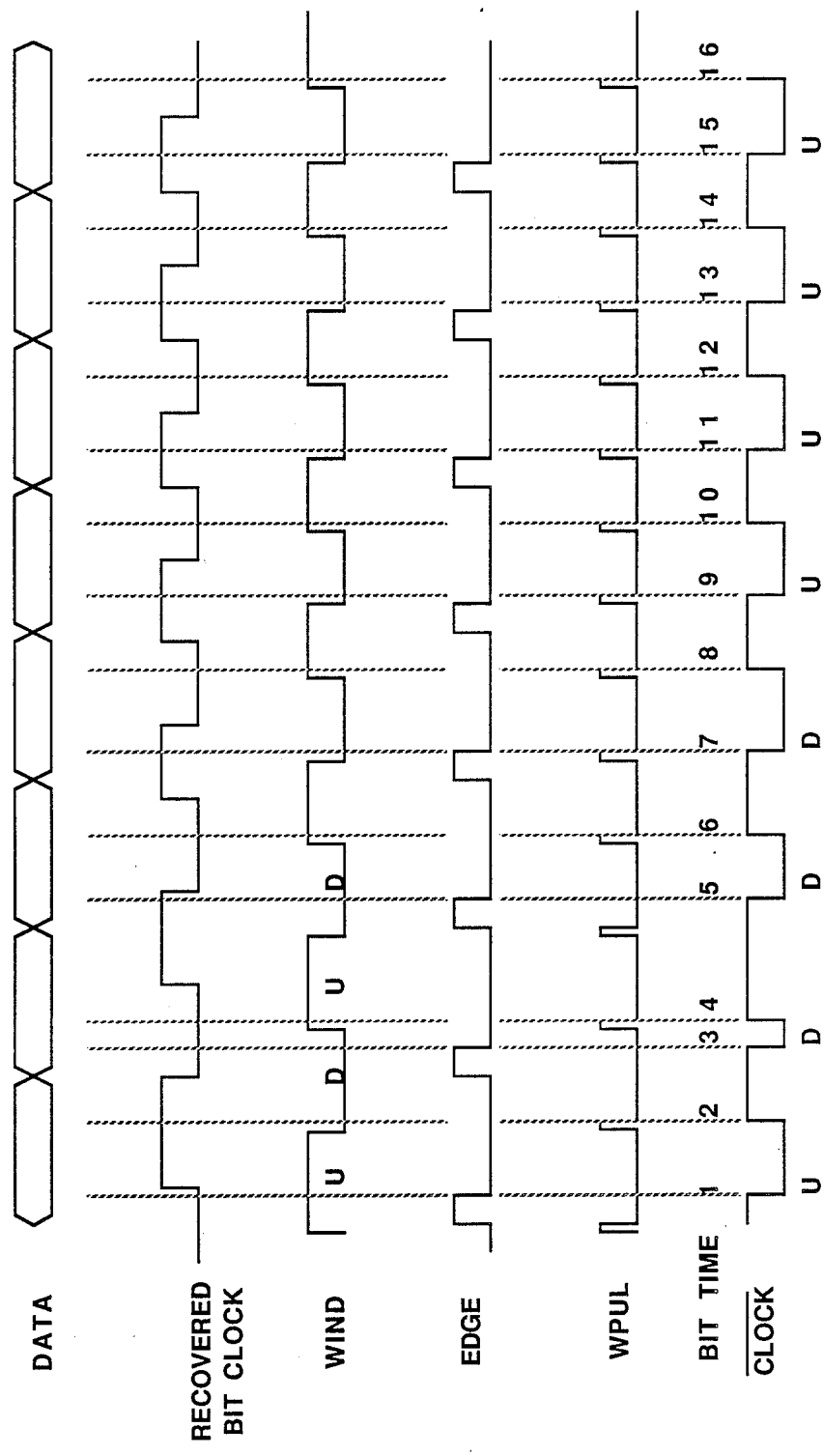
FIG. 6 is a timing diagram for the operation of the lock detector for the preferred embodiment of the present invention.

FIG. 6 shows a timing diagram illustrating a portion of the sequence of the operation of lock detector means 112 for acquiring valid, or invalid, data. The received data is shown in relationship to the recovered bit clock and the window signal. As shown in FIG. 6, bit synchronization has not initially been achieved. The window signal is ninety degrees out-of-phase with the recovered bit clock and the "U" and "D" designations indicate those time intervals when a clock generated will cause the up/down counter to count up or down, respectively. The edge signal shown is initially skewed with respect to the recovered bit clock, as bit synchronization is not fully achieved with the data. The window pulse (WPUL) shown initially sets latch 204, as previously described, to allow only one bit detection per window generated. The clock signal shown either clocks the up/down counter up or down depending on the state of the window signal (WIND), and the "U" and "D" designations indicate the direction up/down counter 208 counted in response to the clock signal being generated. As shown, at bit time 1, the window signal indicated an up count when the edge was detected, therefore up/down counter 208 would have counted up. At bit time 2, latch 204 was set for the next bit edge detection. At bit times 3, 5 and 7, the window signal indicates a down count when the edge is detected, therefore up/down counter 208 counted down. At bit times 4, 6 and 8 latch 204 is set for the next bit edge detection. At bit time 9, the window signal indicates an up count when the edge is detected, therefore up/down counter 208 counted up. Thereafter, the cycle continues, with up/down counter 208 counting up, as bit synchronization is achieved with the received data. It will be appreciated, the timing diagram shown indicates a bit detection for every bit received, as would occur for the alternating 101010... preamble pattern. When valid data is present, considerably more time is required to obtain a valid signal detection, as there are a reduced number of transitions in data compared to the preamble pattern.

Figure 7:
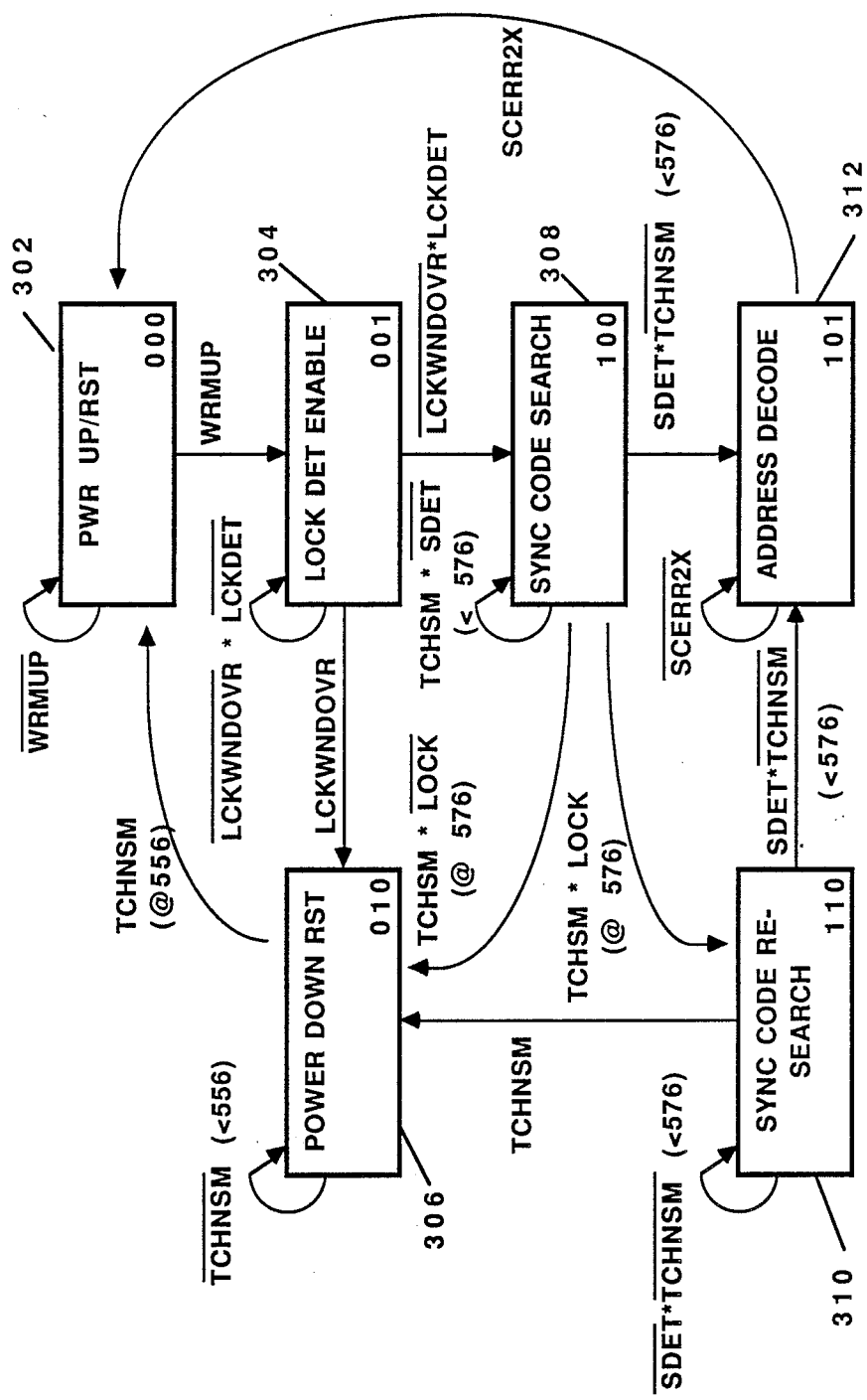
FIG. 7 is a state diagram showing the synchronization codeword search sequence for the preferred embodiment of the present invention.

FIG. 7 is an electrical state diagram describing the battery saving operation for enabling the detection of the synchronization codeword for the preferred embodiment of the present invention. When the selective call receiver is initially turned on, a master reset signal is generated, setting the three state flip-flops of the battery saver controller means 114, flip-flop A 126, flip-flop B 128 and flip-flop C 130, into detector state one, block 302. The flip-flops are set to an initial logic 000 output, respectively. The master reset signal further resets the timer 120 counters to begin timing. Power is initially supplied to receiver 102, and the internal current source and address and synchronization codeword detectors are enabled. The state flip-flops remain in detector state one, block 302, during the thirty-two bit time receiver warm-up time interval. During the receiver warm-up time interval, lock detector 112 operation remains inhibited by the lock detector reset signal 138.

Following receiver warm-up, the state flip-flops are set to detector state two 304, a logic 001 (flip-flop C-B-A), terminating lock detector reset signal 138, which enables the clock input to begin valid or invalid data detection. The state flip-flops remain in detector state two, block 304, until a lock detect signal 113 is generated before the lock detection time interval is completed, or the sixty-four bit lock detection time interval is completed. It should be noted that when synchronization codeword detector 116 is enabled, the received data is continuously correlated for the presence of the synchronization codeword. The description of the operation of the battery saving apparatus 100 to follow assumes the synchronization codeword has not been detected, at each state, unless otherwise described.

When the sixty-four bit lock detection time interval is completed, and the synchronization codeword has not been detected, the state flip-flops are set to detector state three, block 306, a logic 010, terminating the receiver strobe signal 140, the current source enable signal 142 and the supply of power to the address and synchronization codeword detectors. The state flip-flops remain in detector state three, block 306, until a timer reset signal is generated which occurs at a 556 bit count. The state flip-flops are then reset to state one, block 302, reinitiating the search for the synchronization codeword.

When a valid signal is detected during detector state two, block 304, which in the preferred embodiment of the present invention is set for a threshold of twenty bit detections, the state flip-flops are set to detector state four, block 308, a logic 100. The state flip-flops remain in detector state four, block 308, until a synchronization codeword is detected, or a timer reset signal is generated which now occurs at a 576 bit time count. Prior to the 576 bit count timeout, when the 512 bit time count is generated, a lock detector reset signal 138 is generated by output decode circuit 132. The lock detector reset signal 138 resets the lock detector sixty-four bit times prior to the completion of the 576 bit time interval, enabling the lock detector to subsequently detect the presence of valid data on the channel. When the timer reset is generated at the 576 bit time interval, the lock detector output determines the operation to follow. When valid data was not subsequently detected, a valid data absent signal is present at the input of the battery saver controller means 114. In this instance, the state flip-flops are set to detector state three, block 306, and a timer reset signal 136 is generated resetting timer 120. The state flip-flops remain in detector state three, block 306, until the bit count of 556 bit times is achieved. At this time, the state flip-flops are set to detector state one, block 302, and the synchronization codeword detection sequence is again initiated.

When valid data was detected on the channel during detector state four, block 308, and the synchronization codeword was not detected during the first predetermined time interval, the state flip-flops are set to detector state five, block 310, a logic 110. A timer reset signal 136 is also generated resetting timer 120. The state flip-flops remain in detector state five 310 until a synchronization codeword is detected, or a timer reset signal is again generated at a 576 bit time count. When the synchronization codeword is not detected during the 576 bit time interval, the battery saver controller 114 is in detector state five, block 310, a timer reset signal 136 is generated and the state flip-flops are set to detector state three, block 306, thereafter repeating the synchronization codeword search sequence previously described.

When the synchronization codeword is detected during detector state four, block 308 or detector state five, block 310, the state flip-flops are set to the address detection state, block 312, a logic 101. In the address detection state, the selective call receiver operates in a manner well known to one of ordinary skill in the art for decoding POCSAG batches. Power is supplied to the receiver periodically to detect the synchronization codeword, and in the frame to which the receiver is assigned to detect address and message information. When the synchronization codeword is missed twice consecutively, while in the address detection state 312, the state flip-flops are set to detector state one, to begin the synchronization codeword search.

In summary, the operation a battery saving apparatus for enabling the detection of a synchronization codeword has been described. The battery saving apparatus allows a selective call communication receiver to operate at optimum battery saver duty cycles for a predetermined signaling format, insuring the maximum battery life is obtained. The battery saving apparatus further allows the receiver to operate in systems which provide variable bit length preambles, such as would occur when transmitter warm-up leaders are transmitted before the normal preamble, without compromising the ability to reliably detect the synchronization codeword. When the receiver is operated in a system having time intervals wherein the transmitter is frequently dekeyed, or in systems where transmitter time is shared between a number of different signaling formats, the deterioration in battery life due to falsing on noise and on data in a different signaling format is minimized.

While specific embodiments of this invention have been shown and described, further modifications and improvements will occur to those skilled in the art. All modifications which retain the basic underlying principles disclosed and claimed herein are within the scope and spirit of this invention.

We claim:

1. A battery saving method for supplying power to a selective call communication receiver for enabling the detection of a synchronization codeword in data received in a predetermined signaling format having a predetermined message batch length, said method comprising the steps of:

(a) supplying power to the receiver for a first portion of a first predetermined time interval, the first predetermined time interval having a time duration equal to at least the message batch length plus one codeword, for enabling the detection of valid data in the predetermined signaling format (b) maintaining the supply of power to the receiver for the remainder of the first predetermined time interval in response to detecting valid data in the first portion of the first predetermined time interval;

(c) correlating the received data during the first predetermined time interval for the detection of the synchronization codeword;

(d) re-enabling the detection of valid data within a second portion of the first predetermined time interval, in response to the synchronization codeword not being detected prior to the second portion; and (e) maintaining the supply of power to the receiver for a second predetermined time interval, in response to the subsequent detection of valid data in the second portion of the first predetermined time interval.

2. The battery saving method for supplying power to a receiver according to claim 1, said method further comprising the steps of:

(f) terminating the supply of power to the receiver for a third predetermined time interval, in response to the synchronization codeword not being detected during the second predetermined time interval; and (g) repeating steps (a) through (e).

3. The battery saving method for supplying power to a receiver according to claim 1, wherein the second predetermined time interval is substantially equal to the first predetermined time interval.

4. The battery saving method for supplying power to a receiver according to claim 1, wherein the data received in the predetermined signaling format includes a preamble, and wherein the detection of valid data includes the detection of the preamble.

5. The battery saving method for supplying power to a receiver according to claim 4, wherein the data received in the predetermined signaling format further includes selective call message information, and wherein the detection of valid data further includes the detection of the selective call message information.

6. The battery saving method for supplying power to a receiver according to claim 5, wherein the selective call message information includes at least one selective call message batch comprising the synchronization codeword, followed by a predetermined number of frames including address and message information.

7. The battery saving method for supplying power to a receiver according to claim 6, wherein individual receivers are assigned to a predetermined frame for the reception of the address and message information 8. The battery saving method for supplying power to a receiver according to claim 7, said method further comprising the steps of:
   (h) terminating the supply of power to the receiver during the first predetermined time interval in response to detecting the synchronization codeword;
   (i) supplying power to the receiver for a subsequent time interval corresponding to the frame to which the receiver is assigned, for enabling the reception of the address and message information; and
   (j) periodically, thereafter, supplying power to the receiver for the further detection of the synchronization codeword, and address and message information during the frame to which the receiver is assigned.

9. The battery saving method for supplying power to a receiver according to claim 7, said method further comprising the steps of:
   (k) terminating the supply of power to the receiver during the second predetermined time interval in response to detecting the synchronization codeword;
   (l) supplying power to the receiver for a subsequent time interval corresponding to the frame to which the receiver is assigned, for enabling the reception of the address and message information; and
   (m) periodically, thereafter, supplying power to the receiver for the further detection of the synchronization codeword, and address and message information during the frame to which the receiver is assigned.

10. A battery saving apparatus for supplying power to a selective call communication receiver for enabling the detection of a synchronization codeword in data received in a predetermined signaling format having a predetermined message batch length, said apparatus comprising:
    means for supplying power to the receiver for a first portion of a first predetermined time interval, the first predetermined time interval having a time duration equal to at least the message batch length plus one codeword;
    means for detecting valid data in the predetermined signaling format during the first portion of the first predetermined time interval;
    means for maintaining the supply of power to the receiver for the remainder of the first predetermined time interval in response to detecting valid data in the first portion of the first predetermined time interval;
    means, responsive to the received data, for detecting the synchronization codeword during the first predetermined time interval;
    means for subsequently detecting valid data, during a second portion of the first predetermined time interval, in response to the synchronization codeword not being detected prior to the second portion; and
    means for maintaining the supply of power to the receiver for a second predetermined time interval, in response to the subsequent detection of valid data in the second portion of the first predetermined time interval.

11. The battery saving apparatus according to claim 10, wherein said means for supplying power to the receiver for the first portion of the first predetermined time interval comprises a battery saver controller means, for controlling the supply of power to the receiver for the first portion of the first predetermined time interval.

12. The battery saving apparatus according to claim 10, wherein the data received in the predetermined signaling format is received at a predetermined baud rate, and said means for detecting valid data during the first portion of the first predetermined time interval, comprises:
    bit synchronization means, responsive to the received data, for generating a recovered bit clock signal and therefrom a window signal in response thereto; and
    lock detection means, responsive to the window signal and the received data, for generating the valid data signal in response to the data received being the predetermined baud rate.

13. The battery saving apparatus according to claim 12, wherein the window signal is in quadrature with the recovered bit clock signal.

14. The battery saving apparatus according to claim 12, wherein the data received in the predetermined signaling format includes a preamble, and wherein the detection of valid data includes the detection of the preamble.

15. The battery saving apparatus according to claim 12, wherein the data received in the predetermined signaling format includes selective call message information, and wherein the detection of valid data includes the detection of the selective call message information.

16. The battery saving apparatus according to claim 15, wherein the selective call message information includes at least one selective call information batch comprising the synchronization codeword, followed by a predetermined number of frames of address and message information.

17. The battery saving apparatus according to claim 15, wherein individual receivers are assigned to a predetermined frame for the reception of address and message information.

18. The battery saving apparatus according to claim 17, further comprising:

means for terminating the supply of power to the receiver during the first predetermined time interval when the synchronization codeword is detected;

means for supplying power to the receiver for an additional time interval, during the frame to which the receiver is assigned, for enabling the reception of address and message information; and means for periodically, thereafter, supplying power to the receiver for the further detection of synchronization codewords, and address and message information during the frames to which the receiver is assigned.

19. The battery saving apparatus according to claim 17, further comprising:

means for terminating the supply of power to the receiver during the second predetermined time interval when the synchronization codeword is detected;

means for supplying power to the receiver for an additional time interval, during the frame to which the receiver is assigned, for enabling the reception of address and message information; and means for periodically, thereafter, supplying power to the receiver for the further detection of synchronization codewords, and address and message information during the frames to which the receiver is assigned.

20. The battery saving apparatus according to claim 12, wherein said lock detection means comprises:

edge detector means, for determining the occurrence of the edges of the data, and for generating edge detection signals in response thereto;

clock control means, responsive to the edge detection signals, for generating a clock signal in response to the detection of the data edges;

up-down counter means, responsive to the clock signal and the window signal, for generating an counter output signal representative of a count of the number of in-phase and out-of-phase edges; and count detection means, responsive to the counter output signal, for generating the valid data signal in response to a predetermined number of in-phase edges being detected.

21. The battery saving apparatus according to claim 20, wherein said count detection means is further responsive to the count output signal for generating an invalid data signal, in response to a predetermined number of out-of-phase edges being detected.

22. The battery saving apparatus according to claim 20, wherein said predetermined number of in-phase edges detected to generate the valid data signal is within the range of eighteen to twenty counts.

23. The battery saving apparatus according to claim 20, wherein said predetermined number of out-of-phase edges detected to generate the invalid data signal is minus eight counts or more.

24. The battery saving apparatus according to claim 20 further comprising:

means for terminating the supply of power to the receiver in response to the invalid data signal being detected; and means for initially supplying power to the receiver for enabling the initial detection of data valid in the predetermined signaling format and for further enabling the detection of the synchronization codeword.

25. The battery saving apparatus according to claim 10, wherein said means for detecting the synchronization codeword comprises:

bit synchronization means, responsive to the received data, for generating a recovered bit clock signal in response thereto; and synchronization codeword detector means, responsive to the recovered bit clock signal and the received data, for generating a codeword present signal when the synchronization codeword is detected.

26. The battery saving apparatus according to claim 10, wherein said means for subsequently detecting valid data comprises:

bit synchronization means, responsive to the received data, for generating a recovered bit clock signal and a window signal therefrom in response thereto;

timing means, responsive to the recovered bit clock signal, for generating a second timing signal terminating the second portion of the first predetermined time interval;

synchronization codeword detector means, responsive to the recovered bit clock signal and the received data, for generating a codeword absent signal when the synchronization codeword is not detected;

battery saver controller means, responsive to the second timing signal and the codeword absent signal, for generating a valid data reset signal; and lock detection means, responsive to the window signal and the received data, and further responsive to the valid data reset signal, for generating a valid data signal in response to the detection of received data being the predetermined baud rate.

27. The battery saving apparatus according to claim 26, wherein the time interval of the first portion of the predetermined time interval is 512 bit times.

28. The battery saving apparatus according to claim 26, wherein said means for maintaining the supply of power to the receiver comprises said timing means, for further generating a second window complete signal when the first predetermined time interval has elapsed, and said battery saver controller means, being responsive to the second valid data signal and to the second window complete signal, for maintaining the supply of power to the receiver for the second predetermined time interval.

29. The battery saving apparatus according to claim 28, wherein the first predetermined time interval is 576 bit times.

30. The battery saving apparatus according to claim 28, wherein the first predetermined time interval is substantially equal to the second predetermined time interval.

31. The battery saving apparatus according to claim 30, wherein the second predetermined time interval is 576 bit times.

32. The battery saving apparatus according to claim 10, wherein the time interval of the preamble is at least 576 bit times.

33. The battery saving apparatus according to claim 32, wherein the time interval of the preamble is greater than 576 bit times.

34. The battery saving apparatus according to claim 10, further comprising:

means for terminating the supply of power to the receiver following the second predetermined time interval, when the synchronization codeword has not been detected; and means for initially supplying power to the receiver for enabling the initial detection of data valid in the predetermined signaling format and for further enabling the detection of the synchronization codeword.

* * * * *